No. 773,320. PATENTED OCT. 25, 1904.
C. L. HAASE, JR.
YIELDING SHAFT.
APPLICATION FILED SEPT. 21, 1903.
NO MODEL.
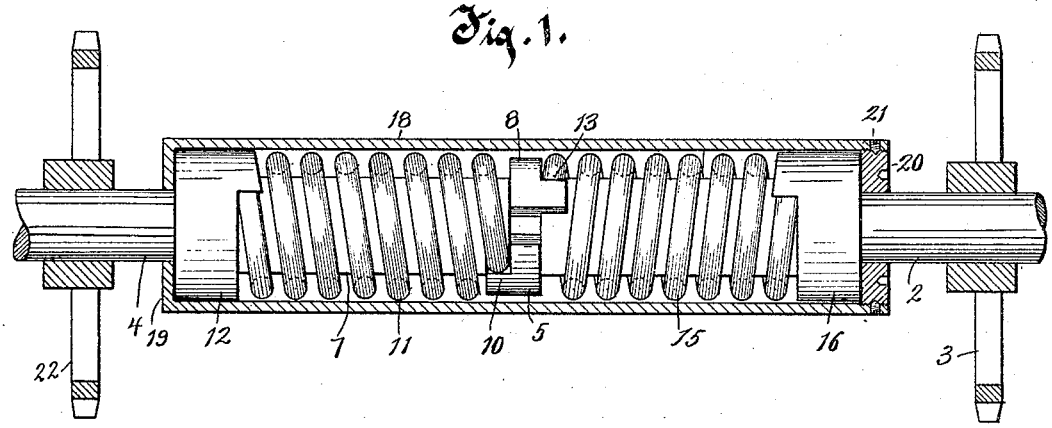
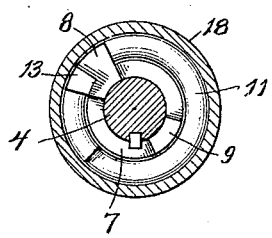
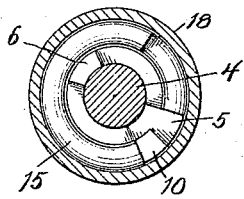
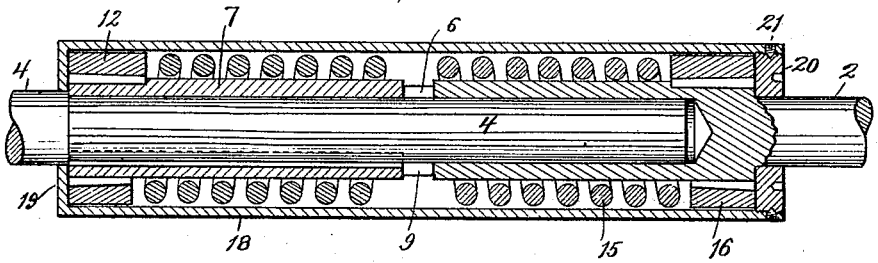
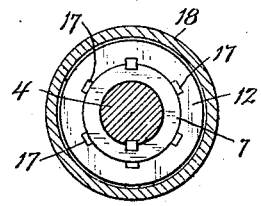
Witnesses.
Inventor.
Charles L. Haase Jr.
By Benedict & Morsell
Attorneys.

No. 773,320.

Patented October 25, 1904.

UNITED STATES PATENT OFFICE.

CHARLES L. HAASE, JR., OF MILWAUKEE, WISCONSIN.

YIELDING SHAFT.

SPECIFICATION forming part of Letters Patent No. 773,320, dated October 25, 1904.

Application filed September 21, 1903. Serial No. 173,956. (No model.)

*To all whom it may concern:*

Be it known that I, CHARLES L. HAASE, Jr., residing at Milwaukee, in the county of Milwaukee and State of Wisconsin, have invented a new and useful Improvement in Yielding Shafts, of which the following is a description, reference being had to the accompanying drawings, which are a part of this specification.

In transmitting power by a revolving shaft the mechanism operated thereby when shafts of the ordinary character are employed gets the shock that occurs by reason of the sudden starting of the engine or driving power, and in case of explosive-engines there is the constantly-recurring shock arising from the constantly-repeated impulses given to the shaft and the driven mechanism by the action of the piston of the engine. In automobiles, where explosive-engines are used largely, this shock on the driven mechanism and on the body of the automobile and its occupants is exceedingly wearing and undesirable.

The object of the present invention is to provide a power-transmitting shaft having such yielding capabilities as to adapt it to transmit power and at the same time to reduce or obviate the shock occurring by reason of sudden impulses in the power.

The invention consists of the device, its parts and combinations, as herein described and claimed, or the equivalents thereof.

In the drawings, Figure 1 shows the invention in a shaft, only a fragment of which is illustrated, the casing and the power-transmitting and power-receiving wheels being shown in section. Fig. 2 is a longitudinal section of the device. Fig. 3 shows the inner end of the left-hand member of the shaft as assembled in Fig. 1. Fig. 4 shows the inner end of the right-hand member of the shaft. Fig. 5 shows details of the means by which the spring-anchoring collars are secured to the shaft.

In the drawings, 2 represents a member of the shaft and may be considered that end of the shaft that is driven by the power, which may be communicated by means of the cog-wheel 3 fixed thereon. This shaft member is provided with an axial bore in its inner end, into which the end of the other shaft member, 4, is received revolubly. That portion of the shaft member 2 that is thus bored is advisably enlarged therefor, as shown in the drawings.

The inner end of the shaft member 2 is provided with a crown-and-spur or radially-projecting sector 5 at one side of the axis of the shaft and a similar but preferably smaller crown-sector 6 at the other side of the axis of the shaft, the two sectors being of the same height. The other shaft member, 4, is provided with a sleeve 7, keyed on the shaft member. This sleeve 7 is of the same diameter exteriorly as the enlarged portion of the shaft member 2 and is provided on its end with a crown-and-spur sector 8 at one side of the axis of the shaft and a crown-sector 9 at the other side of the axis of the shaft, the sectors 8 and 9 being substantially duplicate and complementary of the sectors 5 and 6 on the other member of the shaft and being adapted to occupy the same transverse plane as the sectors 5 and 6 do when the two members of the shaft are brought together in the manner shown in Figs. 1 and 2. These sectors are of such extent circumferentially as to permit lost motion or play of the members of the shaft revolubly; but after permitting a limited amount of play the sectors on the driven shaft member engage or clutch the sectors on the other shaft member, and thereby rotation of the two shaft members together is secured so long as the driven member is rotated in the same direction. Projecting in the direction of the length of the shaft or like a crown-tooth from the sector 5 there is a lug 10, forming an end-thrust bearing for a spring 11, coiled about the sleeve 7, the other end of which spring rests against an anchor-bearing formed by a shoulder therefor on a collar 12, splined and adjustable rotatably on the sleeve 7.

The sector 8 is provided with a lug 13 projecting therefrom in the direction of the length of the shaft, which lug forms an end-thrust bearing for a spring 15, coiled about the enlarged portion of the shaft member 2, the other end of which spring rests against an anchor-bearing formed by a shoulder on a collar 16, splined adjustably on the shaft member 2. To make these collars adjustable revolubly on the shaft members, so as to be capable of being adjusted to regulate the tension of the springs, each collar 12 and 16 is provided with a number of recesses or keyways 17, any one of which may be brought into registration with the corresponding keyway in the sleeve 7 for receiving a key therein, and thereby securing the collar to the sleeve, or in the case of the collar 16 securing it to the enlarged portion of the shaft at such position revolubly as is necessary to give the springs the proper tension.

It will be understood that the sectors 5 and 6 on shaft member 2 and the sectors 8 and 9 on shaft member 4 form a clutch, with one member on each shaft member so disposed as to permit a limited amount of lost motion rotatively between the shaft members, which lost motion is obtained only on the yielding of a spring, and that after such yielded motion the clutch members engage each other rotatively and the shaft becomes practically rigid so long as the rotation continues in the same direction under stress greater than the tension of the spring.

To secure the shaft members in proper endwise relations to each other, I advisably employ a coupling-case 18, which may consist of a tubular steel shell, one end 19 of which may be closed by an integral interior rim fitting around the shaft and bearing inwardly against the end of the sleeve 7, and the other end may be provided with a screw-inserted plug or ring 20, fitting around the shaft and bearing inwardly against the shoulder on the shaft formed by the enlargement thereof made to receive the bore for the other shaft member. The ring end 20 may be additionally secured in place by set-screws 21. This case 18 is advisably made of such size as to just fit on and about the collars 12 and 16 while inclosing the springs 11 and 15, the case thus serving not only as a coupling to secure the shaft members in relative position, but also to inclose the cushioning devices, including the springs and their bearings.

The cog-wheel 22 on the shaft 4 is shown merely to indicate a means of transmitting power from the shaft to driven mechanism. Of course the use of the shaft may be reversed—that is to say, the member 4 may be made to serve as the driven member of the shaft, transmitting its motion to the member 2, which in turn transmits its motion, through any suitable means therefor, to driven mechanism, as through the cog-wheel 3, if desired.

It will be understood that as the springs act separately and in reverse directions only one spring will be needed when the shaft is to be rotated in one direction only; but two springs, resisting and operative in opposite directions, are required when the shaft is to be rotated in both directions—as, for instance, a shaft in an automobile, in which the shaft rotates in one direction for running the automobile ahead and is reversed and rotated in the other direction for running the automobile rearwardly. Where such reversal of motion is required, springs are required one adapted to operate to rotate the shaft in one direction yieldingly and the other adapted to operate the shaft rotatively yieldingly in the other direction. Where a shaft is required to rotate in one direction only, a single spring may be employed.

What I claim as my invention is—

1. In combination, two shaft members one of which is bored axially and a terminal part of the other of which shaft members enters said bore revolubly, sector clutch members on the shaft members arranged to abut against and to engage each other revolubly but to permit a limited amount of lost motion between the shaft members rotatively, a collar on each shaft member at a distance rearwardly from the sector clutch member, and torsional springs coiled respectively about a shaft member and anchored at its outer end to the collar on the shaft and at its inner end engaging the sector clutch member on the abutting shaft member, the springs being coiled and resisting in reverse directions.

2. In combination, two abutting shaft members, a terminal portion of one member entering axially and rotatively the end of the other member, a spring anchor-bearing on each shaft member at a distance from its end, a crown-and-spur sector on each shaft member in a common transverse plane adapted to engage each other revolubly after lost motion, a spring thrust-bearing on each sector, and torsional springs respectively about each shaft member, each spring engaging at its ends an anchor-bearing on one shaft member and a sector thrust-bearing on the other shaft member, the springs being coiled and resisting in reverse directions.

In testimony whereof I affix my signature in presence of two witnesses.

CHARLES L. HAASE, Jr.

Witnesses:
 ANNA F. SCHMIDTBAUER,
 C. T. BENEDICT.